(12) United States Patent
Collins

(10) Patent No.: US 8,740,167 B1
(45) Date of Patent: Jun. 3, 2014

(54) CONTAINER HOLDER SYSTEM AND METHOD USE

(76) Inventor: Suzy Collins, New Braunfels, TX (US)

(*) Notice: Subject to any disclaimer, the term of this patent is extended or adjusted under 35 U.S.C. 154(b) by 1569 days.

(21) Appl. No.: 11/998,950

(22) Filed: Dec. 3, 2007

Related U.S. Application Data

(60) Provisional application No. 60/874,442, filed on Dec. 12, 2006.

(51) Int. Cl.
*A47K 1/08* (2006.01)

(52) U.S. Cl.
USPC ............ 248/311.2; 248/691; 248/213.2; 248/313; 248/316.7; 248/340; 211/106.01; 211/74; 16/437; 224/414; 224/148.4; 224/282

(58) Field of Classification Search
USPC .......... 248/689, 690, 691, 213.2, 215, 311.2, 248/312.1, 313, 316.7, 340, 102, 103; 220/475
See application file for complete search history.

(56) References Cited

U.S. PATENT DOCUMENTS

| | | | | |
|---|---|---|---|---|
| 2,289,701 A | * | 7/1942 | Engel et al. | 248/311.2 |
| 3,021,106 A | * | 2/1962 | Kramer | 248/231.71 |
| 3,184,201 A | * | 5/1965 | Smith | 248/558 |
| 3,269,683 A | * | 8/1966 | Shinaver | 248/230.5 |
| 3,734,439 A | * | 5/1973 | Wintz | 248/224.51 |
| 4,071,175 A | * | 1/1978 | Wagnon | 224/414 |
| 4,324,381 A | * | 4/1982 | Morris | 248/311.2 |
| 4,535,923 A | * | 8/1985 | Manke | 224/550 |
| D285,186 S | | 8/1986 | Sinard | |
| 4,754,902 A | * | 7/1988 | Opfergelt | 224/414 |
| 4,844,399 A | * | 7/1989 | Harm | 248/311.2 |
| 4,887,784 A | * | 12/1989 | Kayali | 248/311.2 |
| 5,007,612 A | * | 4/1991 | Manfre | 248/558 |
| 5,190,257 A | * | 3/1993 | Gradei et al. | 248/231.71 |
| 5,839,632 A | * | 11/1998 | Koday | 224/414 |
| 6,076,792 A | | 6/2000 | Dozeman | |
| 6,264,153 B1 | | 7/2001 | Ragner et al. | |
| 6,325,350 B1 | * | 12/2001 | Mancuso | 248/311.2 |
| 6,357,708 B1 | * | 3/2002 | Carson | 248/229.1 |
| 6,390,427 B1 | * | 5/2002 | McConnell et al. | 248/231.61 |
| 6,425,562 B1 | * | 7/2002 | Knudson | 248/230.1 |
| 6,457,691 B1 | * | 10/2002 | Kao | 248/311.2 |
| 6,505,802 B2 | * | 1/2003 | Fowler | 248/311.2 |
| 6,983,918 B1 | * | 1/2006 | Leasure | 248/311.2 |
| 2001/0032915 A1 | * | 10/2001 | Clifford | 248/311.2 |
| 2006/0284040 A1 | | 12/2006 | Nixon et al. | 248/311.2 |

\* cited by examiner

*Primary Examiner* — Terrell McKinnon
*Assistant Examiner* — Michael McDuffie
(74) *Attorney, Agent, or Firm* — Rafael V. Baca; Baca Law Firm, PLLC

(57) ABSTRACT

A container holder system for attachment to a lawnmower handle assembly. In operation, the container holder system receives a beverage container and pivots with respect to the ground to prevent spilling from the beverage container. Optionally, the container holder system rotates with respect to itself to provide ease of use. The container holder system includes a cage assembly and a mounting device for securing the cage assembly to the lawnmower handle assembly. The cage assembly includes cage arms and a flange interface defined by the cage arms. The mounting device includes a gripping sleeve positioned between the cage arms and the lawnmower handle assembly and includes a clamp for drawing the cage arms and the gripping sleeve against the lawnmower handle assembly.

18 Claims, 5 Drawing Sheets

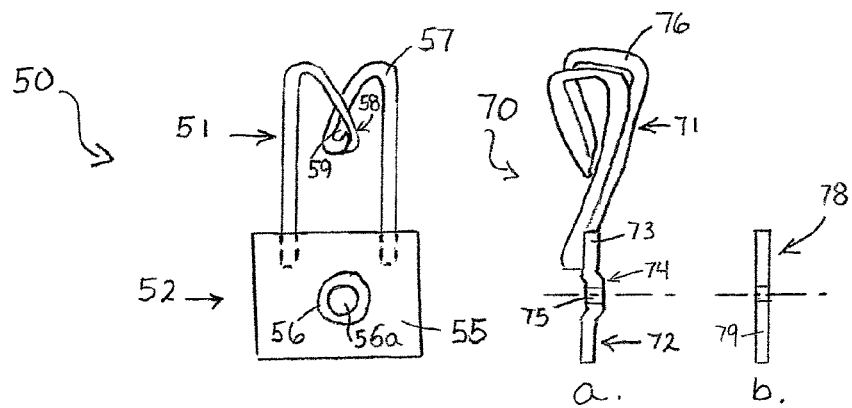
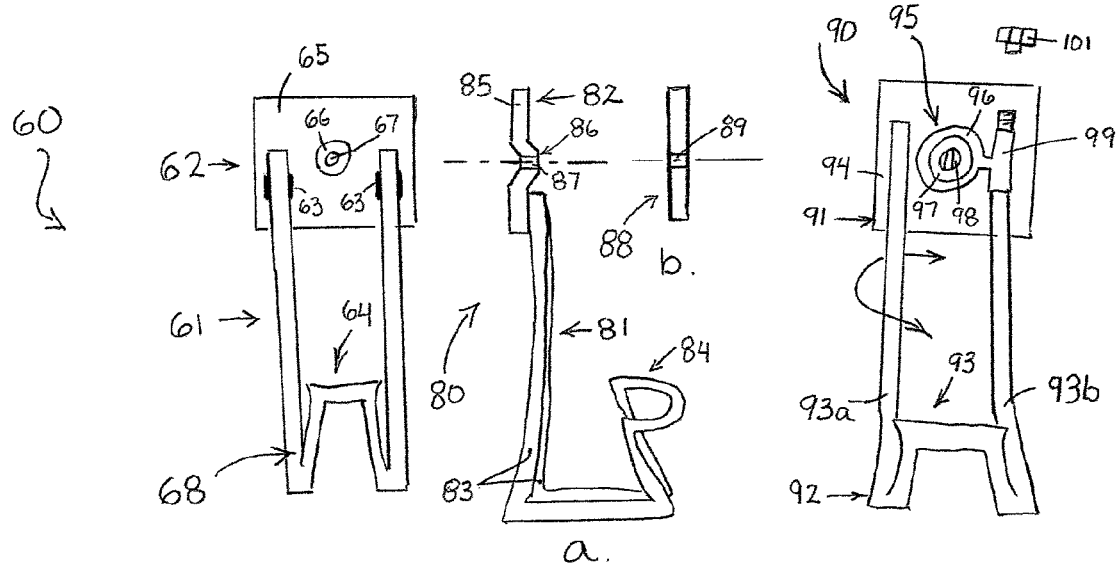
Fig. 4　Fig. 6
Fig. 5　Fig. 7　Fig. 8

CONTAINER HOLDER SYSTEM AND METHOD USE

CROSS REFERENCE TO RELATED APPLICATIONS

This application is related to and claims benefit under 35 U.S.C. §119(e) from prior U.S. Provisional Patent Application Ser. No. 60/874,442 filed on Dec. 12, 2006 entitled "Container Holder System and Method of Use", by inventor Suzy Collins, the entire disclosure of which is hereby incorporated by reference as if fully set forth herein.

BACKGROUND

1. Field of the Invention

The present invention generally relates to a container holder system. More particularly, but not by way of limitation, the present invention relates to a lawnmower system and method that includes a container holder system for securing the beverage container to a lawnmower handle assembly.

2. Description of the Related Art

Generally, beverage container holders are provided to prevent the liquid contents of a beverage container from spilling as the container holder is in transit. Often, beverage container holders are provided for automobile travel.

Beverage container holders as applied to push cart-type devices such as among others lawnmowers, strollers, wheelchairs, wagons, have added complications. Generally, beverage container holders must be secured to a variety of component parts of all sizes, textures, and spatial arrangements.

Illustratively, lawnmowers come in a variety of sizes and spatial configurations that container holders must firmly secure to. Container holders often lack dampers for absorbing mechanical vibrations that may adversely affect the beverage container and its contents. Once secured to a lawnmower, difficulties may arise in orienting the container holder so that the beverage container is at a true vertical relative to the ground. The contents of the beverage container are less likely to spill if oriented at a true vertical relative to the ground. Moreover, although properly secured to the lawnmower at a true vertical relative to the ground, the container holder may not be optimally oriented for easy access.

Unfortunately, there is no known device or method for quickly and accurately securing and positioning a beverage container on a variety of push cart type devices such as lawnmowers. Therefore a need exists for a system and a method for quick and accurate placement of a beverage container on a lawnmower via a container holder. Many other problems and disadvantages of the prior art will become apparent to one skilled in the art after comparing such prior art with the present invention as herein described.

BRIEF DESCRIPTION

Aspects of the invention are found in a container holder system for attachment to a lawnmower handle assembly. In one aspect, the container holder system receives a beverage container and pivots with respect to the ground to prevent spilling from the beverage container. In one aspect, the container holder system rotates with respect to itself to facilitate ease of use. The container holder system includes a cage assembly and a mounting device for securing the cage assembly to the lawnmower handle assembly. The cage assembly includes cage arms and a flange interface defined by the cage arms. The mounting device includes a gripping sleeve positioned between the cage arms and the lawnmower handle assembly and includes a clamp for drawing the cage arms and the gripping sleeve against the lawnmower handle assembly.

Aspects of the invention are found in a lawnmower system for receiving a beverage container thereon. The lawnmower system includes a lawnmower handle assembly and a container holder system. The container holder system includes a top portion and a bottom portion that receives a beverage container and pivots with respect to the top portion. Illustratively, as the top portion is secured to a lawnmower handle assembly, the bottom portion may be pivoted with respect to the ground, such as in a true vertical position, to prevent spilling from the beverage container.

In one aspect, the bottom portion includes a cage retaining portion having first and second cage support backing arms. The bottom portion further includes a swing bracket brace having a swing bracket collar. The swing bracket collar clamps either one of the first or the second cage support backing arms so that the other one of the first or the second cage support backing arms pivots about the clamped first or second cage support backing arms. Accordingly, the container holder system rotates with respect to itself to provide further ease of use.

Aspects of the invention are found in a method for holding a beverage container from a handle assembly including the following steps. Initially, positioning a gripping sleeve provided by a container holder assembly on the handle assembly. Cage aims provided by the container holder system are placed on the gripping sleeve and the handle assembly. Then, a mounting device provided by the container holder system is coupled to the handle assembly.

Other aspects, advantages, and novel features of the present invention will become apparent from the detailed description of the present invention when considered in conjunction with the accompanying drawings.

DRAWINGS

These and other features, aspects, and advantages of the present invention will become better understood when the following detailed description is read with reference to the accompanying drawings in which like characters represent like parts throughout the drawings, wherein:

FIG. 4 is an orthographic view from the front illustrating a top section of a container holder system, the container holder system is one exemplary embodiment of the lawnmower system where the container holder system pivots to a true vertical position with respect to the ground;

Figure 9:
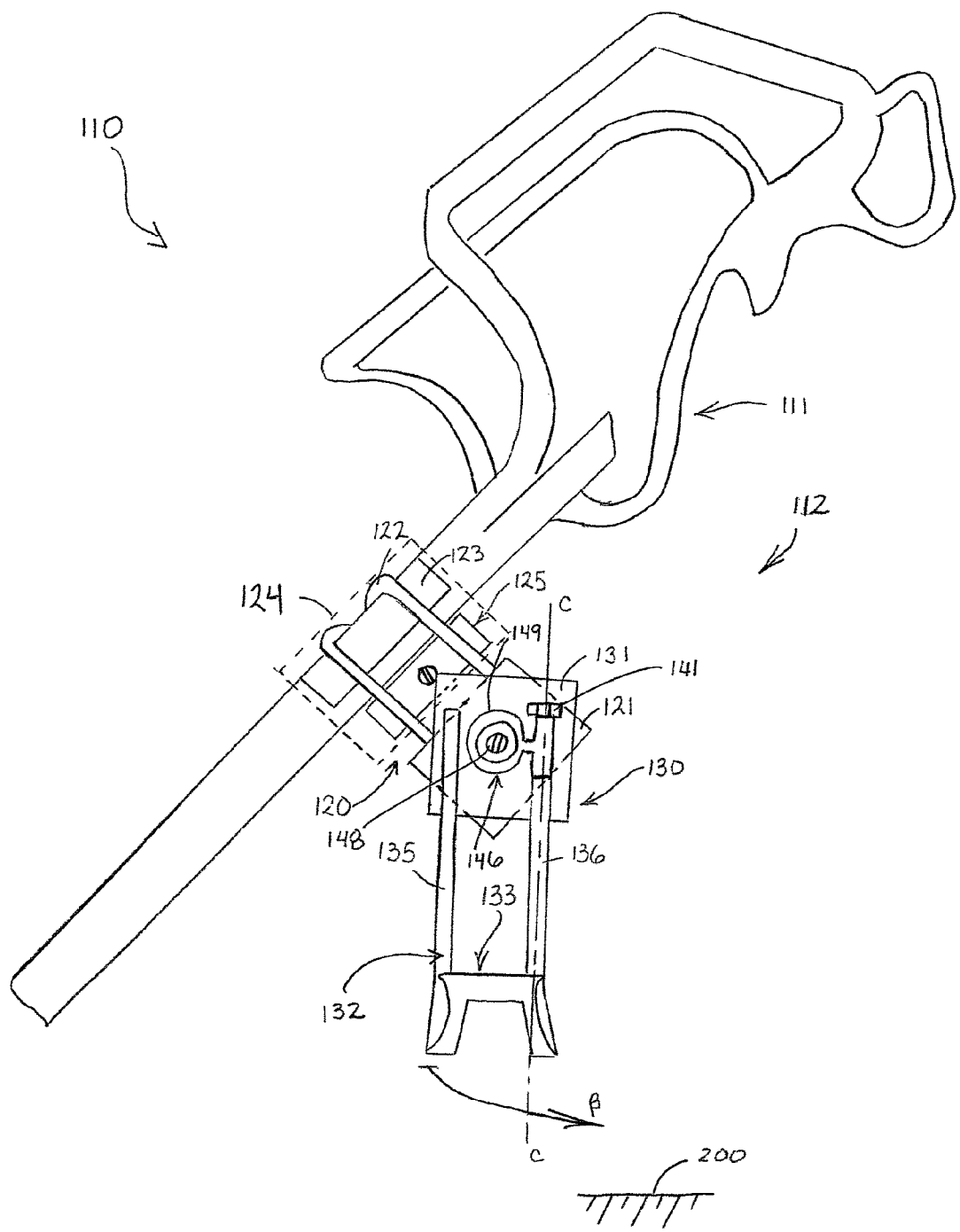
Figure 10:
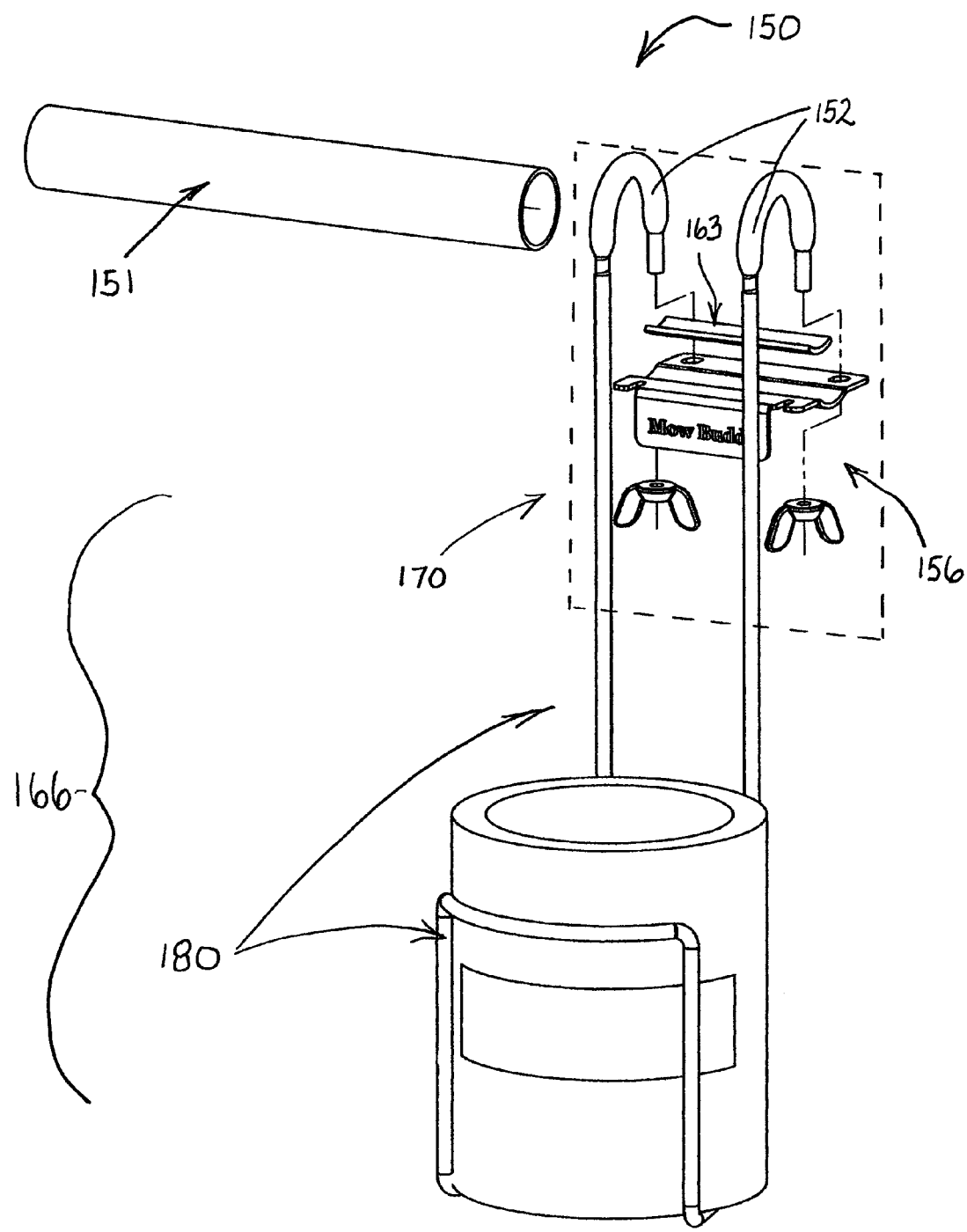

FIG. 5 an orthographic view from the front illustrating a bottom portion of the container holder system of FIG. 4, the bottom portion pivots apart from the top assembly to a true vertical position with respect to the ground;

FIG. 6 is an orthographic view from the side illustrating a top section of a container holder system, where FIG. 6a illustrates the top portion as featuring a first mounting plate having a first raised surface, where FIG. 6b illustrates an alternative embodiment of the first mounting plate;

FIG. 7 is an orthographic view from the side illustrating a bottom section of a container holder system, where FIG. 7a illustrates the bottom portion as featuring a second mounting plate having a second raised surface, where FIG. 7b illustrates an alternative embodiment of the second mounting plate;

FIG. 8 is an orthographic view from the side illustrating one exemplary embodiment of a bottom portion featuring a swing bracket brace for securing a cage assembly and permitting the cage assembly to pivot with respect to itself;

FIG. 9 is an isometric view illustrating one exemplary embodiment of a lawnmower system, the lawnmower system featuring a bottom portion coupled to a top portion, the bottom portion moves from a receiving position to a true vertical position with respect to the ground and, optionally, from a receiving position to a rotated position; and FIG. 10 is an isometric view illustrating one exemplary embodiment of a lawnmower system, the lawnmower system includes a lawnmower handle assembly and a container holder system, the container holder system featuring a cage assembly and a mounting device.

Skilled artisans appreciate that elements in the Figures are illustrated for simplicity and clarity and have not necessarily been drawn to scale. For example, the dimensions of some of the elements in the Figures may be exaggerated relative to the other elements to help improve understanding of the embodiments of the present invention.

DETAILED DESCRIPTION

For a more complete understanding of the present invention, preferred embodiments of the present invention are illustrated in the Figures. Like numerals being used to refer to like and corresponding parts of the various accompanying drawings. It is to be understood that the disclosed embodiments are merely exemplary of the invention, which may be embodied in various forms.

Figure 1:
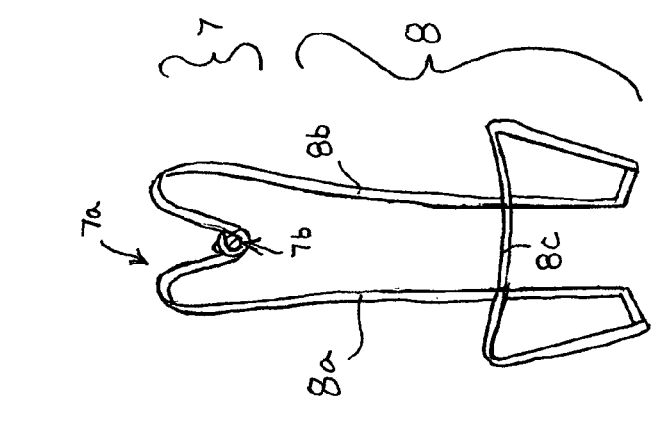
FIG. 1 is an orthographic view from the front of a cage assembly for a container holder system.

FIG. 1 illustrates one aspect, among others, of a cage assembly 5 for a container holder system (not shown). Generally, the cage assembly 5 may be defined by a frame assembly. In one exemplary embodiment, the frame assembly comprises a wire frame assembly. Illustratively, the wire frame assembly may be composed of one contiguous piece of bent metal. In one exemplary embodiment, the wire frame assembly may include a coating disposed thereon to repel liquids such as among others a polymer coating and a rubber coating.

As shown in FIG. 1, the cage assembly 5 includes a mounting portion 7 and a retainer portion 8. As discussed below, the mounting portion 7 receives a mounting device. Accordingly, the mounting device couples to the mounting portion 7 to secure the cage assembly 5 to an object such as among others a lawnmower handle assembly and other push cart-type devices such as strollers, wheelchairs, and wagons.

The mounting portion 7 includes a flange interface 7a for receiving a mounting device. The flange interface 7a defines an eyelet 7b.

As the mounting portion 7 is secured to an object, the retainer portion 8 receives a container, such as among others a beverage container. In one exemplary embodiment, the retainer portion 8 includes a first cage support backing arm 8a and a second cage support backing arm 8b. In operation, a container rests against the first and second cage support backing arms 8a, b. In one exemplary embodiment, the first and second cage support backing arms 8a, b converge to form the flange interface 7a.

Optionally, segments of the retainer and mounting portions are adapted to fit the shape of a beverage container. In one exemplary embodiment, as shown in FIG. 1, the retainer portion 8 includes a retainer section 8c. Illustratively, in one exemplary embodiment, the retainer section 8c is configured to accommodate sports or soft drink bottles that are typically curved.

Figure 2:
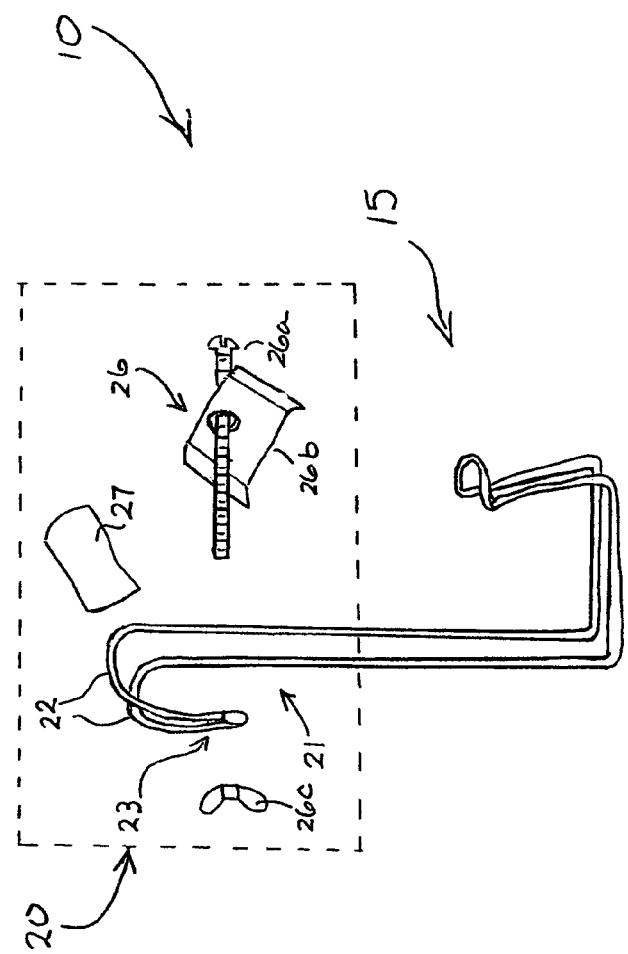
FIG. 2 is an exploded view from the side illustrating a container holder system according to the present invention, the container holder system features a cage assembly and a mounting device.

FIG. 2 illustrates one aspect, among others, of a container holder system 10. Generally, the container holder system 10 includes a cage assembly 15 and a mounting device 20. In operation, the mounting device 20 secures the cage assembly 15 to an anchoring object such as such as a lawnmower handle assembly.

The cage assembly 15 defines a cage backing support 21. In one exemplary embodiment, a container rests against the cage support backing 21. In one exemplary embodiment, the cage assembly 10 is adapted to fit the shape of a beverage container. Illustratively, the cage backing support 21 is adapted to fit the shape of a beverage container. Optionally, the container holder system 10 includes an insulating wrap, such as a KOOZIE, neoprene, polyurethane, and NBR foam, for placement between the beverage container and the cage assembly 15.

In one exemplary embodiment, the cage assembly 15 includes cage arms 22. In one exemplary embodiment, as shown in FIG. 2, each of the cage arms 22 converge to form a flange interface 23. The flange interface 23 defines an eyelet.

The mounting device 20 includes a gripping sleeve 27. In one exemplary embodiment, the gripping sleeve 27 is a thin membrane of sufficient length to contact each of the cage arms 22. The gripping sleeve 27 is placed between the cage arms 22 and the anchoring object. Operatively, the cage arms 22 compress against the gripping sleeve 27 and the anchoring object.

In one exemplary embodiment, the gripping sleeve 27 comprises a non-slip material thereby preventing the cage arms 22 from rotating about the anchoring object. In one exemplary embodiment, the gripping sleeve 27 comprises a resilient material. The resilient material absorbs mechanical vibrations that transfer from the anchoring object to the container held by the cage assembly 15. Illustratively, in one exemplary embodiment, the gripping sleeve is composed of a strip of natural or synthetic rubber or rubber-like material.

The mounting device includes clamp 26. In operation, the clamp 26 is coupled to the cage assembly 15 to provide a force against the anchoring object.

The clamp 26 includes a bracket 26b, a fastener 26a for insertion through the bracket 26b and a securing element 26c for coupling the fastener 26a to the bracket 26b. Illustratively, in one exemplary embodiment, the fastener 26a comprises a bolt and the securing element 26c comprises a wing nut for engagement with the bolt.

The clamp 26 collectively provides a compressive force against the cage arms 22, the gripping sleeve 27, and anchoring object to thus secure the container holder system 10 to the anchoring object. In operation, the fastener 26a is inserted through the bracket 26b as the gripping sleeve 27 is positioned between the cage arms 22 and the anchoring object. The bracket 26b is operatively placed against the cage arms 22 defining the cage support backing 21. The fastener 26a travels through the bracket 26b, between the cage arms 22 so that a distal end of the fastener 26a extends outwardly from the cage support backing 21. The securing element 26c is positioned on the distal end of the fastener 26a and is then drawn along the fastener 26a toward the bracket 26b. In one exemplary embodiment, the clamp 26 is variably drawn against the cage arms 22.

Figure 3:
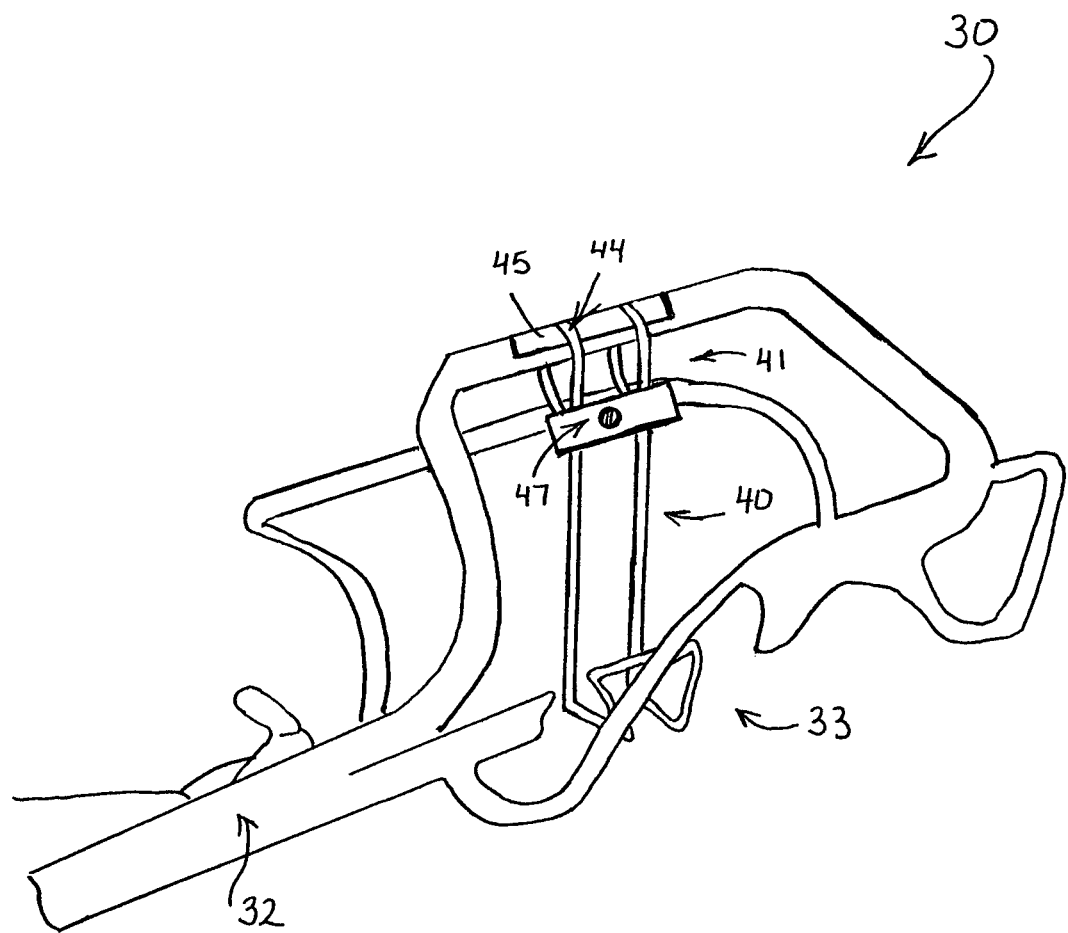
FIG. 3 is an isometric view illustrating a lawnmower system according to the present invention, the lawnmower system including a lawnmower handle assembly and a container holder system.

FIG. 3 illustrates one aspect, among others, of a lawnmower system 30. In operation, the lawnmower system 30 receives a beverage container thereon. As shown in FIG. 3, the lawnmower system 30 includes a lawnmower handle assembly 32 and a container holder system 33. Generally, the container holder system 33 includes a cage assembly 40 and a mounting device 41. In operation, the mounting device 41 secures the cage assembly 40 to the lawnmower handle assembly 32.

In one exemplary embodiment, the cage assembly 40 is adapted to fit the shape of a beverage container. Optionally, the lawnmower system 30 includes an insulating wrap, such as a KOOZIE, neoprene, polyurethane, and NBR foam, for placement between the beverage container and the cage assembly 40.

Referring to FIG. 3, the mounting device 41 includes a gripping sleeve 45. In one exemplary embodiment, the gripping sleeve 45 is a thin membrane of sufficient length to contact each of cage arm 44 provided by the cage assembly 40. Shown in FIG. 3, the gripping sleeve 45 is placed between the cage arms 45 and the lawnmower handle assembly 32. Operatively, the cage arms 44 compress against the gripping sleeve 45 and the lawnmower handle assembly 32. In one exemplary embodiment, the gripping sleeve 45 comprises a non-slip material for preventing the cage arms 45 from rotating against the lawnmower handle assembly 32.

The mounting device 41 includes a clamp 47. The clamp 47 collectively provides a compressive force against the cage arms 44, the gripping sleeve 45, and the lawnmower handle assembly 32 to secure the container holder system 33 to the lawnmower handle assembly 32. Accordingly, while secured to the lawnmower handle assembly 32, a beverage container is inserted within the cage assembly 40.

FIG. 4 illustrates one aspect, among others, of a top section of a container holder system 50. The container holder system is one exemplary embodiment of the lawnmower system where the container holder system pivots to a true vertical position with respect to the ground. Specifically, the top portion 50 facilitates, in part, pivoting of a bottom portion to a true vertical position, such as a bottom portion shown in FIGS. 5, 7, and 8.

The top section of a container holder system 50 includes a top portion 52. The top section of a container holder system 50 further includes a cage mounting portion 51 coupled to the top portion 52.

The top portion 52 includes a first mounting plate 55. The first mounting plate 55 of FIG. 4 defines a first mounting plate pivot point aperture 56a. In one exemplary embodiment, a pivot pin similar to that shown in FIG. 8 (pivot pin 98), is inserted through the first mounting plate pivot point aperture 56a. Optionally, the first mounting plate 55 includes a first raised surface 56. As discussed below, the first raised surface 56 facilitates ease of pivoting between first and second mounting plates.

The cage mounting portion 51 includes cage arms 57 extending outwardly from the first mounting plate 55. As shown in FIG. 4, the cage arms 57 converge to form a flange interface 58. The flange interface 58 defines an eyelet 59. In one exemplary embodiment, a fastener similar to that shown in FIG. 2, is inserted through the eyelet 59 to secure a container holder system to an anchoring object.

FIG. 5 illustrates one aspect, among others, of a bottom section of a container holder system 60. In one exemplary embodiment, the bottom section 60 cooperates with a top section, such as the top section 50 of FIG. 4, a container holder system for secured engagement to an anchoring object. Illustratively, a container holder system and an anchoring object such as a lawnmower handle assembly may collectively define a lawnmower system. In one exemplary embodiment, the container holder system of the lawnmower system pivots to a true vertical position with respect to the ground as illustratively shown in FIG. 9. Specifically, a bottom section 60 pivots apart from a top section to a true vertical position.

The bottom section of a container holder system 60 includes a bottom portion 62. The bottom section of a container holder system 60 further includes a cage retaining portion 61 coupled to the bottom portion 62.

The bottom portion 62 includes a second mounting plate 65. The second mounting plate 65 of FIG. 5 defines a second mounting plate pivot point aperture 67. In one exemplary embodiment, a pivot pin similar to that shown in FIG. 8 (pivot pin 98), is inserted through the second mounting plate pivot point aperture 67. In effect, a pivot pin is inserted through the first mounting plate 55 of the top portion 52 and the second mounting plate 65 of the bottom portion 62. The pivot pin thus operatively binds the first and second mounting plates 55, 65 together and acts as the pivot point for the top section of the container holder system 50 and the bottom section of the container holder system 60.

Optionally, the second mounting plate 65 includes a second raised surface 66. In operation, the second raised surface 66 facilitates ease of pivoting. As discussed in greater detail below, the first and second raised surfaces 56, 66 nest within each other thereby permitting the first and second mounting plates 55, 65 to facilitate pivoting with respect to one another.

The bottom section of a container holder system 60 includes a cage retaining portion 61. The cage retaining portion 61 includes cage support backing 68 extending outwardly from the second mounting plate 65. Optionally, the cage support backing 68 converges to form a retainer section 64. In one exemplary embodiment, the retainer section 64 is adapted to fit the shape of a beverage container.

The cage retaining portion 61 is coupled to the second mounting plate 65. In one exemplary embodiment, as shown in FIG. 5, at least one binder 63 is provided between the cage retaining portion 61 and the second mounting plate 65. Effectively, the at least one binder 63 couples the cage retaining portion 61 and the second mounting plate 65 together. Those of ordinary skill in the art will readily recognize the application of only one binder to permit the rotation of one cage arm about another cage arm. In one exemplary embodiment, the binder 63 comprises a weld.

FIG. 6 illustrates one aspect, among others, of a top section of a container holder system 70. Specifically, FIG. 6a illustrates the top section of a container holder system 70 as featuring a top portion 72. The top portion 72 includes a first mounting plate 73 having a first raised surface 74. The first mounting plate 73 defines a first mounting plate pivot point aperture 75 for receiving a pivot pin therethrough.

The top portion 72 includes a cage mounting portion 71. The cage mounting portion 71 includes cage arms 76 extending outwardly from the first mounting plate 73. In one exemplary embodiment, the cage arms 76 are configured to conform to an anchoring object.

FIG. 6b illustrates an alternative embodiment of a first mounting plate 79. As shown, in one exemplary embodiment, the first mounting plate 79 is flat. The first mounting plate 79 defines a first mounting plate pivot point aperture 75 for receiving a pivot pin therethrough.

FIG. 7 illustrates one aspect, among others, of a bottom section of a container holder system 80. Specifically, FIG. 7a illustrates the bottom section of a container holder system 80 as featuring a bottom portion 82. The bottom portion 82 includes a second mounting plate 85. In one exemplary embodiment, the second mounting plate 85 features a second raised surface 86. The second raised surface 86 defines a second mounting plate pivot point aperture 75 for receiving a pivot pin therethrough.

The bottom portion 82 includes a cage retaining portion 81. The cage retaining portion 81 includes cage support backing 83 extending outwardly from the second mounting plate 85. Optionally, the cage support backing 83 converges to form a retainer section 84. In one exemplary embodiment, the retainer section 84 is adapted to fit the shape of a beverage container.

The cage retaining portion 81 is coupled to the second mounting plate 85. In one exemplary embodiment, at least one binder is provided between the cage retaining portion 81 and the second mounting plate 85. The at least one binder couples the cage retaining portion 81 and the second mounting plate 85 together. In one exemplary embodiment, the at least one binder comprises a swing bracket brace.

FIG. 7b illustrates an alternative embodiment of a second mounting plate 88. As shown, in one exemplary embodiment, the second mounting plate 88 is flat. The second mounting plate 88 defines a second mounting plate pivot point aperture 89 for receiving a pivot pin therethrough.

FIG. 8 illustrates one exemplary embodiment of a bottom section of a container holder system 90. The bottom section of a container holder system 90 includes a second mounting plate 94 and a cage retaining portion 92 coupled to the second mounting plate 94 and extending outwardly therefrom.

The cage retaining portion 92 includes a retainer section 93 and first and second cage support backing arms 93a, 93b respectively. Each cage support backing arm 93a, 93b extends outwardly from the retainer section 93.

In one exemplary embodiment, the cage retaining portion 92 is adapted to fit the shape of a beverage container. Illustratively, the retainer section 93 is adapted to fit the shape of a beverage container. In one illustration, the first and second cage support backing arms 93a, 93b, respectively, are each adapted to fit the shape of a beverage container. Optionally, bottom section of a container holder system 90 includes an insulating wrap, such as a KOOZIE, neoprene, polyurethane, and NBR foam, for placement between the beverage container and the cage retaining portion 92.

As shown in FIG. 8, the bottom section of a container holder system 90 features a swing bracket brace 96. The swing bracket brace 96 is coupled to the cage retaining portion 92. As the swing bracket brace 96 is coupled to the cage retaining portion 92, the swing bracket brace 96 operatively permits the cage retaining portion 92 to pivot with respect to itself.

Specifically, the swing bracket brace 96 includes a swing bracket collar 99. The swing bracket collar 99 may be coupled to either one of the first or second cage support backing arms 93a, 93b. Accordingly, the swing bracket collar 99 clamps either one of the first or second cage support backing arms 93a, 93b against the second mounting plate 94 so that the other one of the first or second cage support backing arms pivots 93a, 93b about the clamped first or second cage support backing arms 93a, 93b.

In one exemplary embodiment, as shown in FIG. 8, the swing bracket collar 99 is coupled to the second cage support backing arm 93b. Accordingly, the swing bracket collar 99 clamps the second cage support backing arm 93b against the second mounting plate 94 so that the first cage support backing arm 93a pivots about the clamped second cage support backing arm 93b from a receiving position for obtaining a beverage container to a pivoted position.

In one exemplary embodiment, shown in FIG. 8, the bottom portion container holder system 90 includes a pivot pin 98. The pivot pin 98 couples the swing bracket collar 99 to the second cage support backing arm 93b. Moreover, in one exemplary embodiment, the second mounting plate 94 defines a second mounting plate pivot point aperture. In one exemplary embodiment, the pivot pin 98 is inserted through the swing bracket collar 99 and the second mounting plate pivot point aperture. In one exemplary embodiment, the pivot pin 98 is a separate component from a fastener provided by a clamp from a mounting device. In one exemplary embodiment, the pivot pin 98 and fastener provided by a clamp are the same component.

Optionally, the swing bracket brace 96 includes a spacer 97. In operation, the spacer 97 distributes the force exerted by to the pivot pin 98 to the swing bracket collar 99.

In one exemplary embodiment, the swing bracket collar 99 locks in place the other one of the first or second cage support backing arms after pivoting about the clamped first or second cage support backing arm. Illustratively, as shown in FIG. 8, the swing bracket collar 99 locks in place the first cage support backing arm 93a after pivoting about the second cage support backing arm 93b that is clamped against the second mounting plate 94 by the swing bracket collar 99.

In one exemplary embodiment, the swing bracket brace 96 includes a lock 101. The lock 101 is coupled to the swing bracket collar 99 and the other one of the first or second cage support backing arms 93a, 93b. The lock 101 selectively permits the swing bracket collar to secure in position the other one of the first or second cage support backing arms after pivoting about the clamped first or second cage support backing arms.

Illustratively, the lock 101 is coupled to the swing bracket collar 99 and to the second cage support backing arm 93b. The lock 101 selectively permits the swing bracket collar 99 to lock in place the first cage support backing arm 93a after pivoting about the second cage support backing arm 93b that is clamped by the swing bracket collar 99 against the second mounting plate 94.

FIG. 9 illustrates one aspect, among others, of a lawnmower system 110. In operation, the lawnmower system 110 receives a beverage container thereon. As shown in FIG. 9, the lawnmower system 110 includes a lawnmower handle assembly 111 and a container holder system 112. Generally, the container holder system 112 includes a top assembly 120 and a bottom assembly 130. In operation, the top assembly 120 secures the bottom assembly 130 to the lawnmower handle assembly 111. Moreover, in one exemplary embodiment, the bottom assembly 130 pivots with respect to the top assembly 120. The bottom assembly 130 features a cage retaining portion 132 such that, optionally, the cage retaining portion 132 may pivot with respect to itself as discussed below.

The top assembly 120 includes a first mounting plate 121. The top assembly 120 further includes cage arms 122 extending from the first mounting plate 121.

The top assembly 120 includes a mounting device 124. As shown in FIG. 9, the mounting device 124 includes a gripping sleeve 123. In one exemplary embodiment, the gripping sleeve 123 is a thin membrane of sufficient length to contact each cage arm 122. The gripping sleeve 123 is placed between the cage arms 122 and the lawnmower handle assembly 111. Operatively, the cage arms 123 compress against the gripping sleeve 123 and the lawnmower handle assembly 111. In one exemplary embodiment, the gripping sleeve 123 comprises a non-slip material thereby preventing the cage arms 122 from rotating against the lawnmower handle assembly 111.

The top assembly 120 further includes a clamp 125 similar to that described in FIGS. 2 and 3 above. In general, the clamp 125 collectively provides a compressive force against the cage arms 122, the gripping sleeve 123, and the lawnmower handle assembly 111 to secure the container holder system 112 to the lawnmower handle assembly 111.

The bottom assembly 130 includes a second mounting plate 131 and a cage retaining portion 132 extending from the second mounting plate 131. As shown in FIG. 9, the cage retaining portion 132 includes a retainer section 133 as well as first and second cage support backing arms 135, 136 respectively. Each cage support backing arm extends outwardly from the retainer section 133.

In one exemplary embodiment, the cage retaining portion 132 is adapted to fit the shape of a beverage container. Illustratively, the retainer section 133 is adapted to fit the shape of a beverage container. In one illustration, the first and second cage support backing arms 135, 136, respectively, are each adapted to fit the shape of a beverage container. Optionally, the lawnmower system 110 includes an insulating wrap, such as a KOOZIE, neoprene, polyurethane, and NBR foam, for placement between the beverage container and the cage retaining portion 132.

As shown, the bottom assembly 130 features a swing bracket brace 146. The swing bracket brace 146 is coupled to the cage retaining portion 132. As the swing bracket brace 146 is coupled to the cage retaining portion 132, the swing bracket brace 146 operatively permits the cage retaining portion 132 to pivot with respect to itself.

Specifically, the swing bracket brace 146 includes a swing bracket collar 149. The swing bracket collar 149 may be coupled to either one of the first or second cage support backing arms 135, 136. As illustratively shown in FIG. 9, in one exemplary embodiment, the swing bracket collar 149 is coupled to the second cage support backing arm 136. Accordingly, the swing bracket collar 149 clamps the second cage support backing arm 136 against the second mounting plate 131 so that the first cage support backing aim 135 pivots about the clamped second cage support backing arm 136.

In one exemplary embodiment, shown in FIG. 9, the bottom assembly 130 includes a pivot pin 148. The pivot pin 148 couples the swing bracket collar 149 to the second cage support backing arm 136. Moreover, in one exemplary embodiment, the second mounting plate 131 defines a second mounting plate pivot point aperture. In one exemplary embodiment, the pivot pin 148 is inserted through the swing bracket collar 149 and the second mounting plate pivot point aperture. In one exemplary embodiment, the pivot pin 148 is a separate component from a fastener provided by a clamp from a container holder system. In one exemplary embodiment, the pivot pin 148 and a fastener provided by a clamp are the same component.

In one exemplary embodiment, the swing bracket brace 146 includes a lock 141. Illustratively, the lock 141 is coupled to the swing bracket collar 149 and to the second cage support backing arm 136. The lock 141 selectively permits the swing bracket collar 149 to lock in place the first cage support backing arm 135 after pivoting about the second cage support backing arm 136 that is clamped against the second mounting plate 131 by the swing bracket collar 149. In one exemplary embodiment, the lock 101 comprises a nut in threaded engagement with the second cage support backing arm 93b where the nut is selectively tightened against the second cage support backing arm 93b to lock the first cage support backing arm in place. In one exemplary embodiment, the nut is in threaded engagement with both the second cage support backing arm 93b and the swing bracket collar 99.

Illustratively, in operation, the container holder system 112 is coupled to the lawnmower handle assembly 111 via a mounting device 124. In particular, the mounting device 124 includes a gripping sleeve 123 that is placed on the lawnmower handle assembly 111. The cage arms 122 of the container holder system 112 are placed over the gripping sleeve 123. The clamp 125 provided by the mounting device 124 acts to secure the container holder system 112 to the lawnmower handle assembly 111.

To adjust the position of the bottom assembly 130 relative to the first mounting plate 121 and the ground 200, the first and second mounting plates 121, 122 pivot relative to a shared pivot pin 148. In one exemplary embodiment, the cage retaining portion 132 is rotated apart from the mounting device 124 from a receiving position for accepting a beverage container to a true vertical position with respect to the ground 200. Moreover, as shown by direction arrow β, one cage arm may be rotated about another. Illustratively, the first cage support backing arm 135 rotates along the direction β about a central axis C-C defined by the second cage support backing arm 136. Operatively, a beverage container held between the first and second cage support backing arm is rotated about the central axis C-C to provide further ease of use.

In particular, as the swing bracket brace 146 is coupled to the cage retaining portion 132, the swing bracket brace 146 operatively permits the cage retaining portion 132 to pivot with respect to itself from a receiving position to a rotated position. The bottom assembly 130 of FIG. 9 includes a pivot pin 148 that couples the swing bracket collar 149 to the second mounting plate 131. Accordingly, the swing bracket collar 149 clamps the second cage support backing arm 136 against the second mounting plate 131 so that the first cage support backing arm 135 pivots along direction β about central axis C-C of the clamped second cage support backing arm 136.

Optionally, the swing bracket brace 146 includes a lock 141 coupled to the swing bracket collar 149 and to the second cage support backing arm 136. While in cooperative engagement with the swing bracket collar 149, the lock 141 selectively permits the swing bracket collar 149 to lock in place the first cage support backing arm 135 after pivoting along direction β and about the second cage support backing arm 136.

FIG. 10 illustrates one aspect, among others, of a lawnmower system 150. The lawnmower system 150 includes a lawnmower handle assembly 151 and a container holder system 166, each similar to that described above. In operation, the container holder system 166 secures a beverage container to the lawnmower system 150.

The container holder system 166 includes a cage assembly 180 and a mounting device 170. The mounting device 170 includes a gripping sleeve 163 positioned between the cage assembly 180 and the lawnmower handle assembly 151. The mounting device 170 includes a clamp 156 coupled to the cage assembly 180. In operation, the clamp 156 provides a force against the lawnmower handle assembly 151.

While only certain features of the invention have been illustrated and described herein, it should be understood that various changes, substitutions, and alterations could be made hereto without departing from the spirit and scope of the invention as defined by the appended claims.

I claim:

1. A lawnmower system, the lawnmower system receiving a beverage container thereon, the lawnmower system comprising:
   a lawnmower handle assembly; and
   a container holder system,
   the container holder system for securing the beverage container to the lawnmower handle assembly,
   the container holder system including
   a cage assembly for receiving the beverage container, a top section and a bottom section pivotally coupled to the top section, the cage assembly includes a first cage support backing arm and a second cage support backing arm, the bottom section receiving the beverage container and pivoting with respect to the top section, the bottom section includes a swing bracket brace coupled to a cage retaining portion, the swing bracket brace includes a swing bracket collar coupled to either one of the first cage support backing arm or the second cage support backing arm, the swing bracket collar clamps either one of the first or the second cage support backing arms against a mounting plate and the other one of the first or the second cage support backing arms pivots about the clamped first cage support backing arm or the clamped second cage support backing arm via the swing bracket collar.

2. The lawnmower system according to claim 1 wherein the swing bracket collar locks in place with the other one of the first or the second cage support backing arms after pivoting about the clamped first or the clamped second cage support backing arm.

3. The lawnmower system according to claim 2 wherein the swing bracket brace includes a lock, the lock is coupled to the swing bracket collar and the other one of the first or the second cage support backing arms and wherein the lock selectively permits the swing bracket collar to lock in place the other one of the first or the second cage support backing arms after pivoting about the clamped first or the clamped second cage support backing arm.

4. A lawnmower system, the lawnmower system receiving a beverage container thereon, the lawnmower system comprising: a lawnmower handle assembly; and a container holder system, the container holder system for securing the beverage container to the lawnmower handle assembly, the container holder system including a cage assembly for receiving the beverage container, a top section and a bottom section pivotally coupled to the top section, the cage assembly includes a first cage support backing arm and a second cage support backing arm, the bottom section receiving the beverage container and pivoting with respect to the top section, the bottom section includes a swing bracket brace coupled to a cage retaining portion, the swing bracket brace includes a swing bracket collar coupled to either one of the first or the second cage support backing arms, wherein the swing bracket brace includes a lock, the lock is coupled to the swing bracket collar and the other one of the first or the second cage support backing arms, and wherein the lock selectively permits the swing bracket collar to lock in place the other one of the first or the second cage support backing arms after pivoting about the clamped first or the clamped second cage support backing arm.

5. The lawnmower system according to claim 4 wherein the swing bracket collar clamps either one of the first or the second cage support backing arms against a mounting plate.

6. The lawnmower system according to claim 5 wherein the other one of the first or the second cage support backing arms pivots about the clamped first cage support backing arm or the clamped second cage support backing arm.

7. The lawnmower system according to claim 6 wherein the swing bracket collar locks in place with the other one of the first or the second cage support backing arms after pivoting about the clamped first or the clamped second cage support backing arm.

8. The lawnmower system according to claim 4 wherein the container holder system further includes a mounting device, the mounting device includes a gripping sleeve positioned between the cage assembly and the lawnmower handle assembly and a clamp coupled to the cage assembly to provide a resilient force against the lawnmower assembly.

9. The lawnmower system according to claim 4 wherein the bottom section pivots from a receiving position to a true vertical position with respect to the ground.

10. The lawnmower system according to claim 4 wherein the bottom section of the container holder system includes a mounting plate and a cage retaining portion coupled to and extending from the mounting plate.

11. The lawnmower system according to claim 10 wherein the cage retaining portion includes a retainer section and a first and a second cage support backing arm each of the first and the second cage support backing arms extending outwardly from the retainer section.

12. A lawnmower system, the lawnmower system receiving a beverage container thereon, the lawnmower system comprising: a lawnmower handle assembly; and a container holder system, the container holder system for securing the beverage container to the lawnmower handle assembly, the container holder system including a cage assembly for receiving the beverage container, a top section and a bottom section coupled to the top section, the cage assembly includes a first cage support backing arm and a second cage support backing arm, the bottom section receiving the beverage container, the bottom section includes a swing bracket brace coupled to the cage retaining portion, the swing bracket brace includes a swing bracket collar coupled to either one of the first or the second cage support backing arms, wherein the swing bracket collar clamps either one of the first or the second cage support backing arms against a mounting plate, and wherein the other one of the first cage support backing arm or the second cage support backing arm pivots about the clamped first cage support backing arm or the clamped second cage support backing arm.

13. The lawnmower system according to claim 12 wherein the swing bracket collar locks in place with the other one of the first or the second cage support backing arms after pivoting about the clamped first or the clamped second cage support backing arm.

14. The lawnmower system according to claim 12 wherein the swing bracket brace includes a lock, the lock is coupled to the swing bracket collar and the other one of the first or the second cage support backing arms.

15. The lawnmower system according to claim 14 wherein the lock selectively permits the swing bracket collar to lock in place the other one of the first or the second cage support backing arms after pivoting about the clamped first or the clamped second cage support backing arm.

16. The lawnmower system according to claim 12 wherein the container holder system further includes a mounting device, the mounting device includes a gripping sleeve positioned between the cage assembly and the lawnmower handle assembly and a clamp coupled to the cage assembly to provide a resilient force against the lawnmower assembly.

17. The lawnmower system according to claim 12 wherein the bottom section of the container holder system includes a mounting plate and a cage retaining portion coupled to and extending from the second mounting plate.

18. The lawnmower system according to claim 12 wherein the cage retaining portion includes a retainer section and a first and a second cage support backing arm each of the first and the second cage support backing arms extending outwardly from the retainer section.

* * * * *